US011874686B2

(12) United States Patent
Miller et al.

(10) Patent No.: US 11,874,686 B2
(45) Date of Patent: Jan. 16, 2024

(54) JOYSTICK

(71) Applicant: AGCO International GmbH, Neuhausen (CH)

(72) Inventors: Peter Miller, Marktoberdorf (DE); Alexander Barzen, Ettlingen (DE); Jan Weigand, Marktoberdorf (DE)

(73) Assignee: AGCO International GmbH, Neuhausen (CH)

( * ) Notice: Subject to any disclaimer, the term of this patent is extended or adjusted under 35 U.S.C. 154(b) by 0 days.

(21) Appl. No.: 17/597,332

(22) PCT Filed: Jun. 1, 2020

(86) PCT No.: PCT/EP2020/065112
§ 371 (c)(1),
(2) Date: Jan. 3, 2022

(87) PCT Pub. No.: WO2021/001099
PCT Pub. Date: Jan. 7, 2021

(65) Prior Publication Data
US 2022/0244753 A1 Aug. 4, 2022

(30) Foreign Application Priority Data
Jul. 1, 2019 (GB) ..................................... 1909472

(51) Int. Cl.
*G05G 9/047* (2006.01)
*G05G 5/05* (2006.01)

(52) U.S. Cl.
CPC ............... *G05G 9/047* (2013.01); *G05G 5/05* (2013.01); *G05G 2009/04703* (2013.01);
(Continued)

(58) Field of Classification Search
CPC ......... G05G 9/047; G05G 2009/04703; G05G 2009/04748; G05G 2009/04774;
(Continued)

(56) References Cited

U.S. PATENT DOCUMENTS 4,492,830 A * 1/1985 Kim .................. G05G 9/04796 200/6 A
4,680,577 A 7/1987 Straayer et al.
(Continued)

FOREIGN PATENT DOCUMENTS

| | | |
|---|---|---|
| DE | 102014108195 A1 | 1/2015 |
| EP | 1884858 A1 | 2/2008 |
| FR | 3056315 A1 | 3/2018 |

OTHER PUBLICATIONS

UK Intellectual Property Office, Search report for related UK Application No. GB1909472.1, dated Dec. 24, 2019.
(Continued)

*Primary Examiner* — Daniel D Yabut

(57) ABSTRACT

A joystick control device including a base and a teeter board supported on the base by at least first and second pivoting mounts, with each pivoting mount guiding relative rotary motion between the base and the teeter board about a respective axis of rotation, and the respective axes of rotation of the first and second pivoting mounts are spaced apart and extend parallel to each other. A handle effects movement of the teeter board, which movement is detected by a sensor arranged to generate an output signal indicative of the position and orientation of the teeter board relative to the base. Third and fourth pivoting mounts having respective axes of rotation perpendicular to those of the first and second pivoting mounts are suitably also provided to enable the device to provide two-axis control.

13 Claims, 4 Drawing Sheets

(52) U.S. Cl.
CPC ............ *G05G 2009/04748* (2013.01); *G05G 2009/04774* (2013.01); *G05G 2505/00* (2013.01)

(58) Field of Classification Search
CPC .......... G05G 2009/04714; G05G 2009/04755; G05G 2009/04733; G05G 5/05
See application file for complete search history.

(56) References Cited

U.S. PATENT DOCUMENTS

| | | | | |
|---|---|---|---|---|
| 5,786,997 | A | 7/1998 | Hoyt et al. | |
| 6,227,066 | B1 | 5/2001 | Stanchniak | |
| 6,399,904 | B1 * | 6/2002 | Mimata | H01H 25/04 200/406 |
| 6,593,909 | B1 * | 7/2003 | Chou | G06F 3/0338 345/157 |
| 2011/0284785 | A1 | 11/2011 | Yoshimoto et al. | |
| 2018/0356854 | A1 | 12/2018 | Spiteri | |

OTHER PUBLICATIONS

European Patent Office, International Search Report related to International Patent Application No. PCT/EP2020/065112, dated Aug. 14, 2020.

* cited by examiner

JOYSTICK

FIELD OF THE INVENTION

The invention relates to manually-operable input devices in the form of single- or multi-axis control levers (generally known as joysticks) such as are used to control movable objects such as vehicles, aircraft or ships, or to control virtual objects on a screen of a computer controlled system.

BACKGROUND

A joystick is a manually-operable control device with a handle to be moved relative to a base. The degree of deflection of the handle relative to the base can be determined. According to the degree of deflection a signal can be put out and used to control a moveable object. This object can be a concrete object such as a vehicle, an aircraft or a ship or it can be a virtual object such as a cursor on a screen of a computer controlled system.

Typically, the handle can be moved or deflected out of a neutral (typically central) position into different directions. The simplest variant is a handle with one degree of freedom that can be moved in a forward and/or backward direction. This type of joystick could be used as a vehicle throttle control. In a further form, joysticks are known in which the handle can additionally be moved in a sideward direction, for example to produce left or right directional commands. Also rotational movements are possible.

In a joystick, the handle is mounted in the base. Different types of mounting are known—for example ball joints or cardan joints for enabling moving of the handle of a joystick in forward and backward direction as well as in left and right directions.

United Kingdom patent application GB 2 007 063A shows an example of a joystick with a handle mounted with a ball joint in the base, and U.S. Pat. No. 2,929,258 shows an example of a joystick with a handle mounted with a cardan joint in the base. As can be seen from the figures of both these documents, the base encloses a great volume as is required to encase all of the necessary mechanical elements, such as the bearings of the mounting of the handle. Thus the base of these joysticks waste a lot of space. The kinematic of the ball joints and cardan joints additionally delimit the haptic and ease of use of the joystick. If an operator wants to deflect fully the handle of the joystick, he requires a relatively long actuation movement of his hand or lower arm. The haptic of the handle is the same irrespective of the direction of movement of the handle and cannot be adapted. Furthermore, the handle as such is typically mounted statically unstable without a predetermined central or neutral position and needs additional elements such as springs to centre and hold the handle in the neutral position. A self-centring of the handle itself without such additional elements is not generally possible.

It is an object of the invention to provide a joystick that overcomes one or more of the disadvantages mentioned above.

SUMMARY OF THE INVENTION

In accordance with a first aspect of the present there is provided a joystick control device comprising:

a base portion;

a teeter board supported on the base portion by first and second pivoting mounts, each pivoting mount being configured to guide relative rotary motion between the base and the teeter board about a respective axis of rotation;

a handle operable by a user to effect movement of the teeter board; and a sensor arranged to generate an output signal indicative of the position and orientation of the teeter board relative to the base;

wherein the respective axes of rotation of the first and second pivoting mounts are spaced apart and extend parallel to each other. As will be understood, rotating the teeter board about the first pivot mount axis of rotation will result in disengagement of the second pivoting mount (and vice versa).

This use of dual pivoting mounts provides a number of advantages, including the enabling of a thin and low volumetric construction of the base (as will be seen from the exemplary embodiments described hereinafter). Also, such a construction facilitates better haptic or ergonomic performance: shorter actuation movements of the handle to achieve full deflection compared to conventional joystick joints mean that, for example, the lower arm of an operator can stay lying on the armrest of tractor terminal (in which the joystick is provided as a control device) and from which it needs not be lifted.

Furthermore, the use of dual pivoting mounts enables self-centring and static mechanical stability of the mounted handle in the neutral position to be achieved without the need for additional supporting elements as springs to centre and hold the handle in the neutral position.

Preferably, the teeter board is further supported on the base portion by third and fourth pivoting mounts, each pivoting mount being configured to guide relative rotary motion between the base and the teeter board about a respective axis of rotation; wherein the respective axes of rotation of the third and fourth second pivoting mounts are spaced apart and extend parallel to each other, and perpendicular to the respective axes of rotation of the first and second pivoting mounts. In addition to adding a second operational axis to the joystick control device, the mutually orthogonal disposition of the first/second and third/fourth pivoting mounts provides mechanical decoupling of the behaviour of the pivoting actuation of the handle in forward/backward and sideward directions, in contrast to joysticks with a ball or cardan joint that have rotation axes that intersect in one point.

Each pivoting mount may comprise one or more rounded protrusions from one of the teeter board and base portion engaging a rounded bearing seat on the other of the teeter board and base portion. This rounding of protrusions and bearing seats supports smooth and directionally precise rotational movement of the joystick in the forward/backward/left/right directions.

Preferably, the base portion comprises a partial enclosure containing the teeter board and the sensor (and optionally other circuitry associated with the joystick and/or the function it is provided to perform), with the partial enclosure having an opening through which the handle passes. As will be described further below, the size and/or positioning of the opening is suitably such as to prevent the handle being moved past a pivot mount rotational axis, such that the teeter board and handle will always tilt back to the neutral position (without additional mechanical aids) if the handle is not held by a user.

Where the joystick control device is operable in two axes (i.e. includes the third and fourth pivoting mounts), the handle suitably extends in a direction substantially perpendicular to the respective axes of rotation of the first, second, third and fourth pivoting mounts. The handle may be a unitary construction with the teeter board, or the latter may suitably include a receptacle or socket into which the handle may be fitted.

Preferably the joystick control device has a neutral operating position in which the teeter board is in contact with the base portion at the first and second pivoting mounts (and third and fourth pivoting mounts where provided). In this neutral operating position the teeter board holds the handle in a statically stable position in which a self-driven deflection (i.e. movement due to weight alone) of the handle out of the neutral operating position is prevented.

In a preferred embodiment of the joystick control device the separation of the respective axes of rotation of the first and second pivoting mounts and or of the third and fourth pivoting mounts are such dimensioned that the gravitational force of the handle urges the handle from a position different from the neutral operating position into the neutral operating position.

Whilst generally not required to achieve the return to the neutral position (as described above), biasing means such as springs or magnets arranged to urge the control device to the neutral operating position may be provided.

The handle may be attached to the teeter board at a position closer to one of the first and second pivoting mounts than the other, in order to increase or decrease the extent of user movement of the handle required to achieve full deflection in a particular direction.

Where the joystick control device is operable in two axes (i.e. includes the third and fourth pivoting mounts), the separation of the respective axes of rotation of the first and second pivoting mounts may be different from the separation of the respective axes of rotation of the third and fourth pivoting mounts. In this way, a longer throw of the lever may be specified for forwards/backwards inputs than for left/right inputs (or vice versa).

The handle of the joystick control device may be further operable by a user to effect movement of the teeter board in a direction towards and away from the base portion, and the sensor is configured to generate an output signal indicative of the resultant separation teeter board and base portion.

Preferably, in case of a rotary motion of the first and second pivoting mounts around their respective axis of rotation the sensor is configured to generate an output signal indicative of the amount of rotary motion and in case of a rotary motion of the third and fourth pivoting mounts around their respective axis of rotation the sensor is configured to generate a binary output signal indicative of the rotary motion. Thus, a forward and backward movement of the handle generates a different type of signal than a sideward movement of the handle. Depending on the type of signal a different function can be triggered. For example the binary signal can be used for a switching on/off function of a tool or implement of an agricultural vehicle such as a tractor, in combination with a control signal corresponding to the amount of the rotary motion to control a setpoint of the activated tool or implement.

BRIEF DESCRIPTION OF THE DRAWINGS

The invention will now be described, by way of example only, with reference to the accompanying drawings in which.

DETAILED DESCRIPTION OF SPECIFIC EMBODIMENTS OF THE INVENTION

Figure 1:
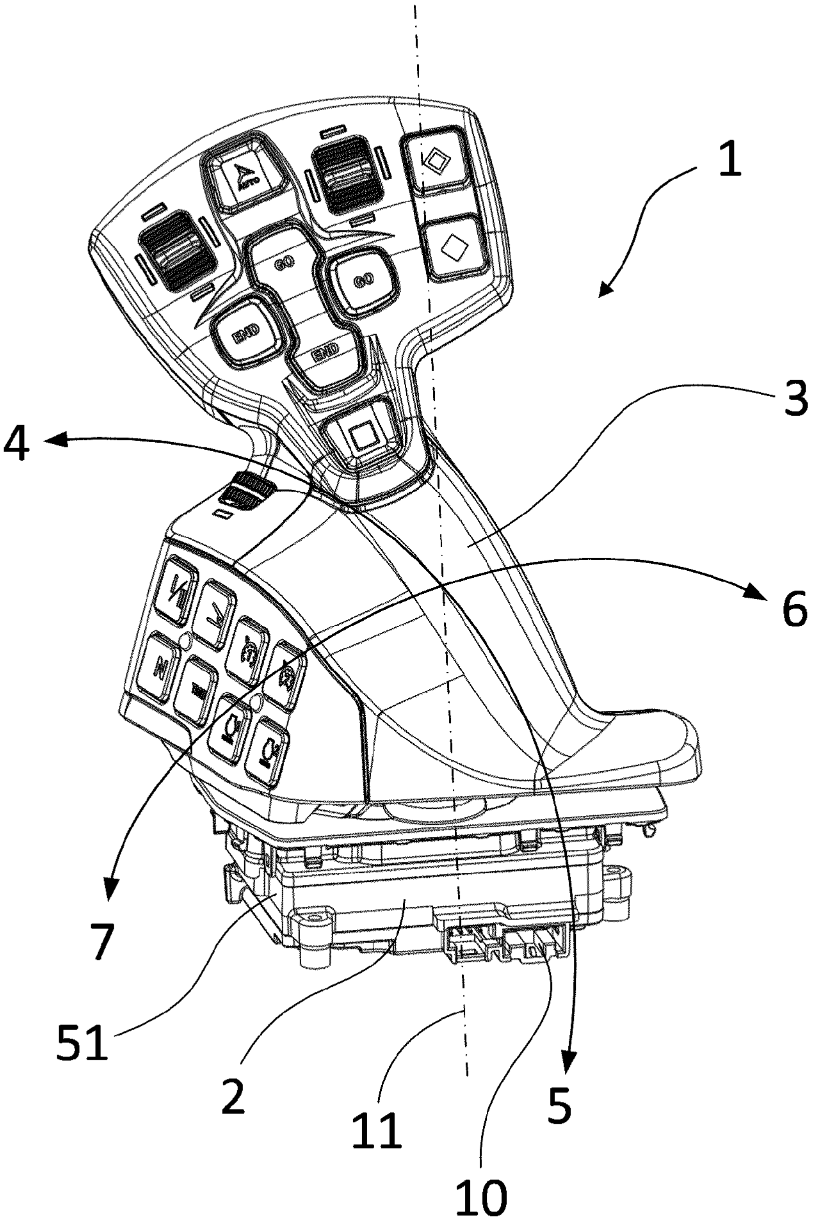
FIG. 1 schematically represents a joystick comprising a base and a handle.

FIG. 1 shows a joystick control device 1 comprising a base 2 and a handle 3 extending along a z-axis 11. The handle 3 is moveable relative to the base 2 and can be moved out of its neutral position into a forward direction 4, a backward direction 5, a right direction 6 and a left direction 7. The handle 3 contains several input elements such as buttons, levers and/or rotatable wheels to trigger a function assigned to the corresponding input element. The handle 3 also contains indicators such as LEDs to indicate a status to the operator. The joystick 1 contains an electrical jack 10 for plugging in a corresponding electrical plug to connect the joystick 1 to a control unit (not shown) such as a microcontroller. The base 2 comprises a mechanical enclosure 51 to protect the electronic components within the base 2.

Figure 2:
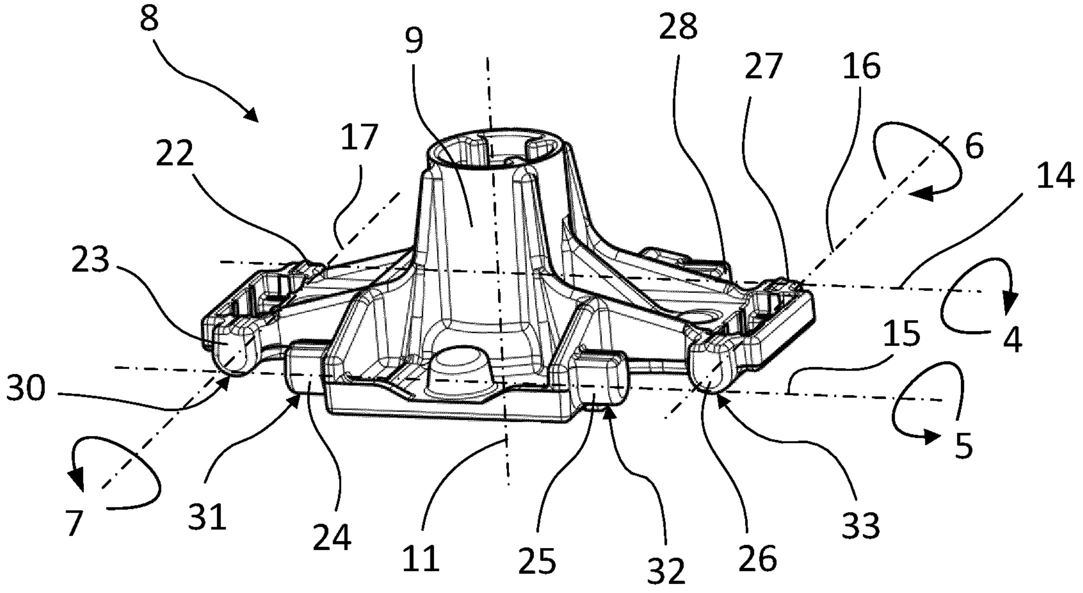
FIG. 2 shows a teeter board in a three dimensional view, which board comprises a component of the joystick of FIG. 1.
Figure 3:
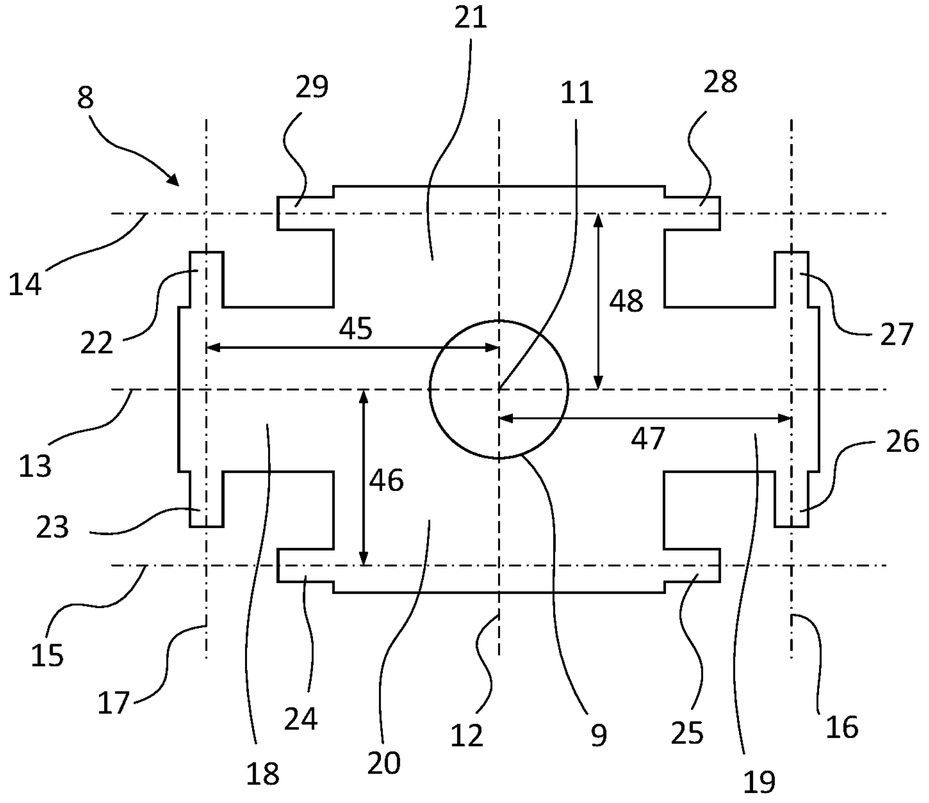
FIG. 3 schematically represents the teeter board of FIG. 2 in a planar view.

A planar section, extending laterally from the lower end of the handle 3, and referred to herein as a teeter board 8 (due to its seesaw motion in use) is shown in FIG. 2 in a 3-dimensional view and in FIG. 3 in a schematically planar view. The teeter board 8 has a connector 9 to which the handle 3 can be mechanically fixed. If the handle 3 is moved, the force or the torque applied to handle 3 will be transferred to the connector 9. The connector 9 extends along the z-axis 11. The teeter board 8 is cross shaped with two arms 18 and 19 extending along an x-axis 13 and with two arms 20 and 21 extending along a y-axis 12. The three axis x (11), y (12) and z (11) are orthogonal to each other.

Each arm 18, 19, 20 and 21 comprises at its distal end two opposed extensions that are aligned orthogonal to the axis along which the corresponding arm extends, that is to say:

- arm 18 comprises the opposed extensions 22 and 23 extending along a left rotation axis 17. The left rotation axis 17 is orthogonal to the x-axis 13 and spaced away with the distance 45 from the parallel y-axis 12;
- arm 19 comprises the opposed extensions 26 and 27 extending along a right rotation axis 16. The right rotation axis 16 is orthogonal to the x-axis 13 and spaced away with the distance 47 from the parallel y-axis 12;
- arm 20 comprises the opposed extensions 24 and 25 extending along a backward rotation axis 15. The backward rotation axis 15 is orthogonal to the y-axis 12 and spaced away with the distance 46 from the parallel x-axis 13;
- arm 21 comprises the opposed extensions 28 and 29 extending along a forward rotation axis 14. The forward rotation axis 14 is orthogonal to the y-axis 12 and spaced away with the distance 48 from the parallel x-axis 13.

Figure 4:
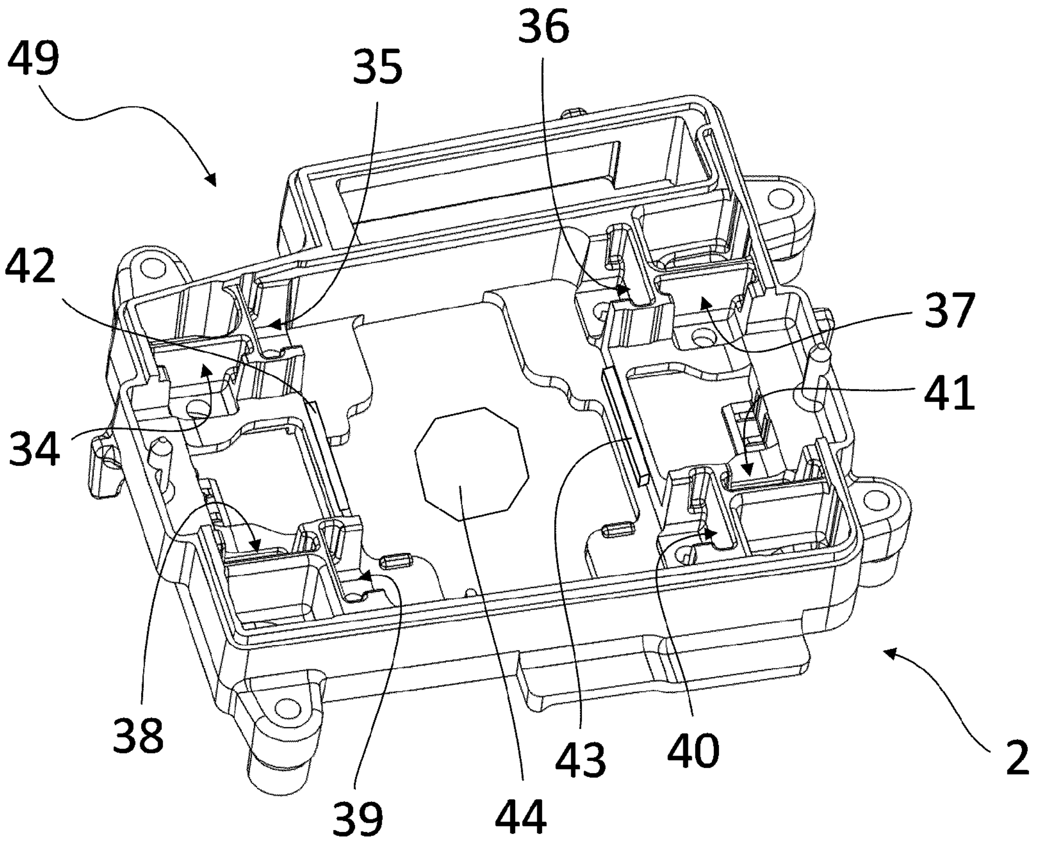
FIG. 4 shows the base of the joystick in a three dimensional view separate from the other components of the joystick.

The teeter board 8 is mounted in a bearing shell 49 of the base 2 shown in FIG. 4 as a separate part. The bearing shell 49 enables tilting movements of the teeter board 8 relative to the base 2 around the four rotation axes 14, 15, 16 and 17.

For each of the eight extensions 22 to 29 the bearing shell 49 comprises a corresponding bearing 34 to 41—namely extension 29 is mounted in bearing 35, extension 28 is mounted in bearing 36, extension 27 is mounted in bearing 37, extension 26 is mounted in bearing 41 and so on.

Figure 5:
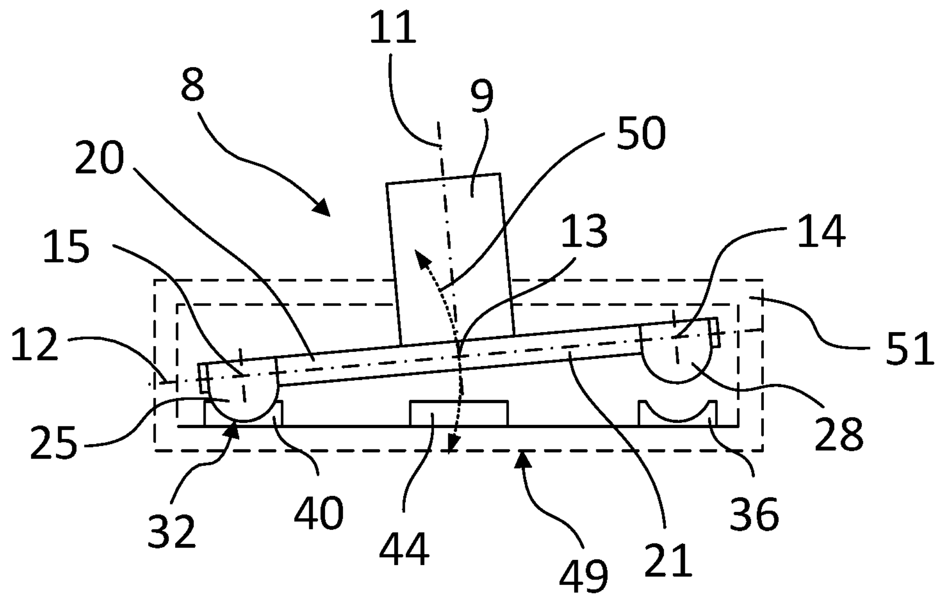
FIG. 5 schematically shows the teeter board mounted in an enclosure forming a part of the base and in a deflected position.

For example, if the handle 3 of the joystick 1 is moved to the backward direction 5, then the connector 9 urges the teeter board 8 to tilt around the backward rotation axis 15 whilst a rounding 31 of the protrusion or extension 24 rolls over the surface of the bearing 39 and a rounding 32 of the extension 25 rolls over the surface of the bearing 40 (see FIG. 5). Hence, the distal end of the arm 20 will be rotated around the backward rotation axis 15 which causes the teeter board 8 to be tilted. Along with the rotation of the extensions 24 and 25 within their corresponding bearings 39 and 40, the extensions 28 and 29 of the arm 21 at the opposite will be lifted up, that is to say the extensions 28 and 29 of the arm 21 at the opposite rotate around the backward rotation axis 15. In analogous manner, the connector 9 (and respectively the handle 3) rotate also around the backward rotation axis 15 with the rotation radius 50 defined by the length of the arm 20 defining the distance 46.

Vice versa, if the joystick 1 will be moved to the forward direction 4, then the extensions 28 and 29 of the arm 21 will be rotated around the forward rotation axis 14 together with the extensions 24 and 25 of the arm 20 at the opposite end, whereas the extensions 24 and 25 will be lifted up.

Analogous to the forward and backward actuation of the joystick 1 the teeter board 8 tilts around the right rotation axis 16 if the handle 3 will be moved to right direction 6 or tilts around the left direction axis 17 if the handle 3 will be moved to the left direction 7—namely the rotation axis about which the handle 3 will be tilted changes in respect of the movement direction of the handle 3 of the joystick 1.

If the joystick will be actuated diagonally, e. g. in right forward direction, the teeter board 8 tilts around two rotation axes correspondingly, so the right rotation axis 16 and forward rotation axis 14 simultaneously. If the handle 3 will be moved back into the neutral position, then all extensions 22 to 29 will be mounted in their respective bearings 34 to 41 again.

As shown in FIG. 3, the length of the arms 18 to 21 can be different. Theoretically the length of each arm 18 to 21 can be different to any other arm. In the example shown, the arms 20 and 21 extending along the y-axis 12 have the same length and the arms 18 and 19 extending along the x-axis 13 have the same length, whereas the arms 20, 21 extending along the y-axis 12 are shorter than the arms 18, 19 extending along the x-axis 13. With reference to FIG. 3, the distance 46 and distance 48 have the same length and distance 45 and 47 have the same length, whereas the distances 46 and 48 are shorter than the distances 45 and 47.

Since the rotation radius of the handle 3 is defined by the distance between the rotation axis the teeter board 8 tilts about and the z-axis 11 (e. g. rotation radius 50 is defined by the distance 46) and the fact that the distances 45, 46, 47 and 48 of the arms 18, 19, 20 and 21 vary, the rotation radius of the handle 3 changes in respect of the movement direction of the handle 3 of the joystick 1.

As shown in FIG. 5, the enclosure 52 of the base 2 limits the range of tilting of the teeter board 8 and prevents the teeter board 8 escaping the bearing shell 49.

In the neutral position of the handle 3, the extensions 22 to 29 of the teeter board 8 are all in physical contact with their corresponding bearings 34 to 41. Thus the teeter board 8 as well as the handle 3 are positioned in a static stable fashion—namely the handle 3 stays centred and is upheld in the neutral position by its gravitational force as long as the centre of mass of the handle 3 does not move beyond one of the rotation axes 14 to 17. By the fact, that all rotation axes 14 to 17 are spaced away from the z-axis with the distances 45 to 48, and the fact that the enclosure 51 prevents a rotational movement that would lead to a movement of the centre of mass of the handle 3 beyond one of the rotation axes 14 to 17, the handle 3 falls back automatically from a deflected position into the neutral position. Thus, additional elements to centre the handle 3 and to hold the handle 3 in the neutral position, such as springs, are not required but (as described below) these may be provided to enforce the self-centring effect.

Each movement of the teeter board 8 is detected by a 3D Hall-effect sensor 44 located in the base 2. The signals of the 3D Hall effect sensor 44 are outputted at the electrical jack 10. The 3D sensor 44 can interpret the movement of the teeter board 8 in an analogous or binary manner. In the analogous manner the 3D sensor 44 generates signals that correspond to the degree of rotation of the teeter board 8. In the binary manner, the signal of the 3D sensor 44 indicates only whether the teeter board 8 is tilted in a certain direction or not.

Whilst not required to return the joystick control device to its neutral position when not held by a user (as mentioned above), optionally the base 2 may comprise two magnets 42 and 43. The magnetic force of these both magnets 42 and 43 biases the teeter board 8 into the neutral position and holds it in this position. So, before the handle 3 can be moved into one of the directions 4 to 7, the operator has to overcome the magnetic force. This prevents an unintended actuation of the handle 3 which could be caused if the base 2 vibrates or the hand of operator trembles.

Instead of the magnets 42 and 43 (or additionally) one or more mechanical springs (not shown) can be arranged between the base 2 and the teeter board 8. The force of the springs biases the teeter board 8 into the neutral position, with the biasing force of the springs increasing with an increasing actuation direction of the handle 3 out of the neutral position.

Besides an actuation along the x- or y-axis 13, 12 of the handle 3, the handle 3 can also be moved along the z-axis 11 by pressing and/or pulling the handle 3 along this axis. The 3D Hall effect sensor 44 distinguishes all movement directions of the teeter board 8 and determines the amount of movement in each direction. The results are outputted as electrical signals at the electrical jack 10.

In the foregoing, the applicants have described a joystick control device 1 comprising a base 2 and a teeter board 8 supported on the base by at least first pivoting mounts 29, 35, 28, 36 and second pivoting mounts 24, 39, 25, 40, with each pivoting mount suitably comprising two extensions or protrusions and bearings arranged on the same axis of rotation. Each pivoting mount guides relative rotary motion between the base 2 and the teeter board 8 about a respective axis of rotation 14, 15, and the respective axes of rotation of the first and second pivoting mounts are spaced apart and extend parallel to each other. A handle 3 effects movement of the teeter board 8, which movement is detected by a sensor 44 arranged to generate an output signal indicative of the position and orientation of the teeter board 8 relative to the base 2. Third pivoting mounts 26, 40, 27, 36 and fourth pivoting mounts 22, 34, 23, 38 having respective axes of rotation 16, 17 perpendicular to those of the first and second pivoting mounts are suitably also provided to enable the device to provide two-axis control.

From reading the present disclosure, other modifications will be apparent to persons skilled in the art. Such modifications may involve other features which are already known in the field of control devices and component parts therefore and which may be used instead of or in addition to features already described herein.

ELEMENTS

1 Joystick
2 Base
3 Handle
4 Forward direction
5 Backward direction
6 Right direction
7 Left direction
8 Teeter board
9 Connector
10 Jack
11 Z-axis
12 Y-axis
13 X-axis
14 Forward rotation axis
15 Backward rotation axis
16 Right rotation axis
17 Left rotation axis
18 Arm
19 Arm
20 Arm
21 Arm
22 Extension
23 Extension
24 Extension
25 Extension
26 Extension
27 Extension
28 Extension
29 Extension
30 Rounding
31 Rounding
32 Rounding
33 Rounding
34 Bearing
35 Bearing
36 Bearing
37 Bearing
38 Bearing
39 Bearing
40 Bearing
41 Bearing
42 Magnet
43 Magnet
44 3D Hall effect sensor
45 Distance
46 Distance
47 Distance
48 Distance
49 Bearing shell
50 Rotation radius
51 Enclosure

The invention claimed is:

1. A joystick control device comprising:

a base portion;

a teeter board supported on the base portion by first and second pivoting mounts, each pivoting mount configured to guide relative rotary motion between the base and the teeter board about a respective axis of rotation;

a handle operable to effect movement of the teeter board; and a sensor configured to generate an output signal indicative of position and orientation of the teeter board relative to the base;

wherein, the respective axes of rotation of the first and second pivoting mounts are spaced apart and extend parallel to each other, wherein the teeter board is further supported on the base portion by third and fourth pivoting mounts, each of the pivoting mounts configured to guide relative rotary motion between the base and the teeter board about a respective axis of rotation, wherein, the respective axes of rotation of the third and fourth pivoting mounts are spaced apart and extend parallel to each other, and perpendicular to the respective axes of rotation of the first and second pivoting mounts, and wherein in case of rotary motion of the first and second pivoting mounts around the respective axis of rotation, the sensor is configured to generate an output signal indicative of the amount of rotary motion, and in case of rotary motion of the third and fourth pivoting mounts around the respective axis of rotation, the sensor is configured to generate a binary output signal indicative of the rotary motion.

2. The joystick control device of claim 1, wherein a distance of separation between the respective axes of rotation of the first and second pivoting mounts is different from a distance of separation between the respective axes of rotation of the third and fourth pivoting mounts.

3. The joystick control device of claim 2, wherein each of the pivoting mounts comprise at least one rounded protrusion from one of the teeter board and base portions engaging a rounded bearing seat on the other of the teeter board and base portions.

4. The joystick control device of claim 2, wherein the base portion comprises a partial enclosure containing the teeter board and the sensor; and an opening through which the handle passes.

5. The joystick control device of claim 2, wherein the handle extends in a direction substantially perpendicular to the respective axes of rotation of the first, second, third and fourth pivoting mounts.

6. The joystick control device of claim 2, having a neutral operating position in which the teeter board is in contact with the base portion at the first and second pivoting mounts.

7. The joystick control device of claim 6, wherein the teeter board is in contact with the base portion at the first and second pivoting mounts and holds the handle in a statically stable position.

8. The joystick control device of claim 6, wherein gravitational force acting on the handle urges the handle from a position different from the neutral operating position into the neutral operating position.

9. The joystick control device of claim 6, further comprising biasing means arranged to urge the control device to the neutral operating position.

10. The joystick control device of claim 9, in which the biasing means comprise one or more magnets.

11. The joystick control device of claim 9, in which the biasing means comprise one or more springs.

12. The joystick control device of claim 2, in which the handle is attached to the teeter board at a position closer to one of the first and second pivoting mounts than the other.

13. The joystick control device of claim 2, wherein the handle is further operable to move the teeter board in a direction towards and away from the base portion, and the sensor is configured to generate an output signal indicative of the resultant separation between the teeter board and the base portion.

* * * * *